United States Patent [19]

Harris

[11] Patent Number: 4,605,386

[45] Date of Patent: Aug. 12, 1986

[54] COMPACT VARIABLE SPEED PULLEY ASSEMBLY

[76] Inventor: Gerald R. Harris, P.O. Box 1148, Pryor, Okla. 74361

[21] Appl. No.: 766,646

[22] Filed: Aug. 19, 1985

[51] Int. Cl.[4] ............................................. F16H 55/56
[52] U.S. Cl. .......................................... 474/8; 474/17
[58] Field of Search ................... 474/8, 17, 24, 30, 32, 474/33, 35

[56] References Cited

U.S. PATENT DOCUMENTS

| | | |
|---|---|---|
| 2,283,392 | 5/1942 | Shadrick . |
| 2,607,235 | 8/1952 | Ruegenberg . |
| 2,699,071 | 1/1955 | Miner . |
| 2,891,410 | 6/1959 | Papageorges . |
| 2,900,834 | 8/1959 | Bessette . |
| 2,994,228 | 8/1961 | Osborne . |
| 3,393,572 | 7/1968 | Larson ................................ 474/17 |
| 3,616,706 | 11/1971 | Shimamoto . |

*Primary Examiner*—James A. Leppink
*Assistant Examiner*—Frank McKenzie
*Attorney, Agent, or Firm*—Manfred M. Warren; Robert B. Chickering; Glen R. Grunewald

[57] ABSTRACT

A compact, variable speed pulley assembly is disclosed in which pulley faces are mounted to a pulley shaft for rotation with respect thereto and for relative axial displacement along the shaft. A torsion spring is connected to transmit a torque force from the shaft to at least one of the pulley faces. The pulley assembly further includes a motion damping brake which applies a sliding friction force resisting relative angular displacement between the pulley faces and the pulley shaft. This friction force damps out over-correction by the torsion spring for speed variations induced by changes in the V-belt width, machine dynamic imbalance and workpiece characteristics. Fatigue of the torsion spring is eliminated without increasing the pulley assembly bulk by providing a second compression spring or providing a conical torsion spring.

14 Claims, 4 Drawing Figures

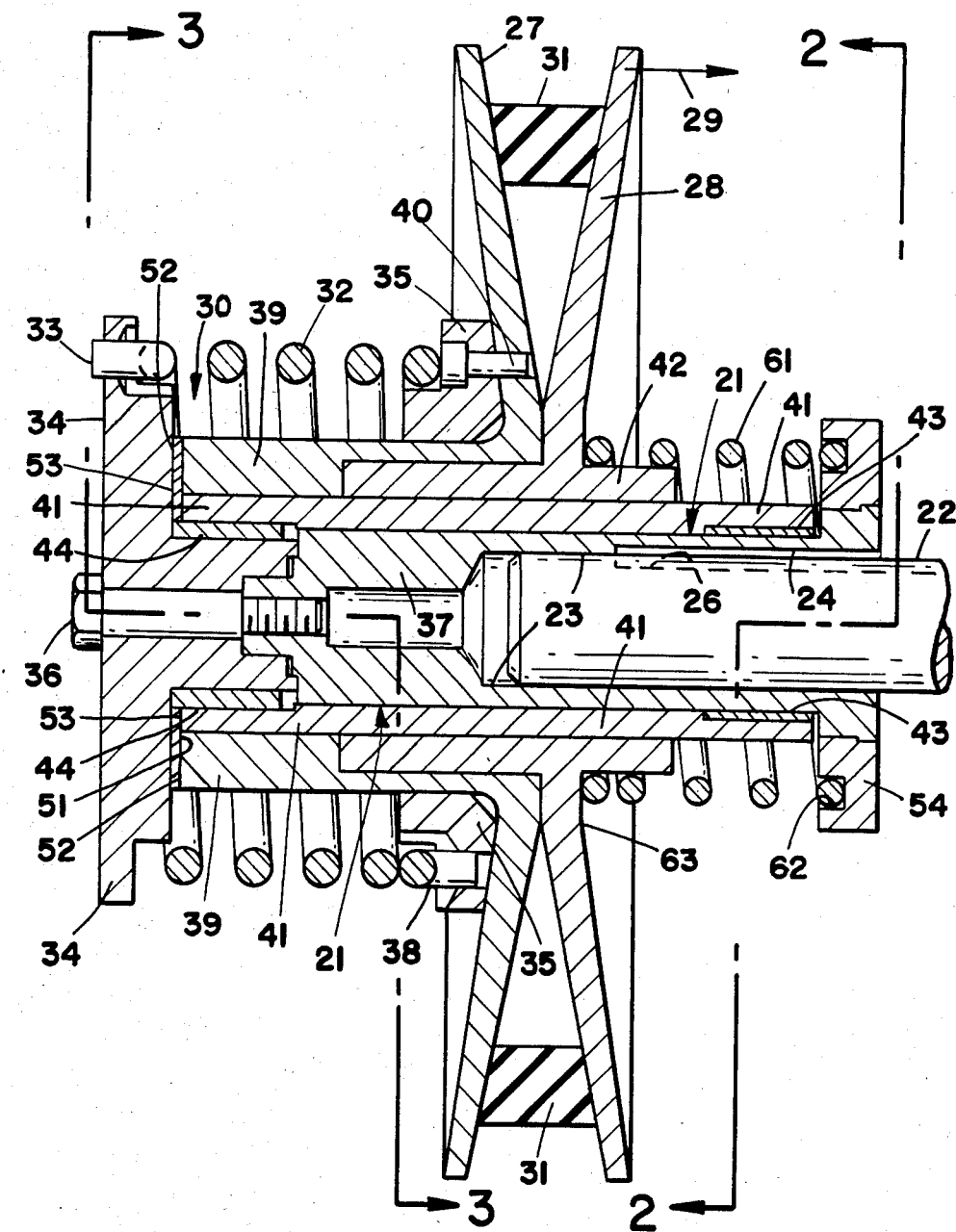
FIG_1

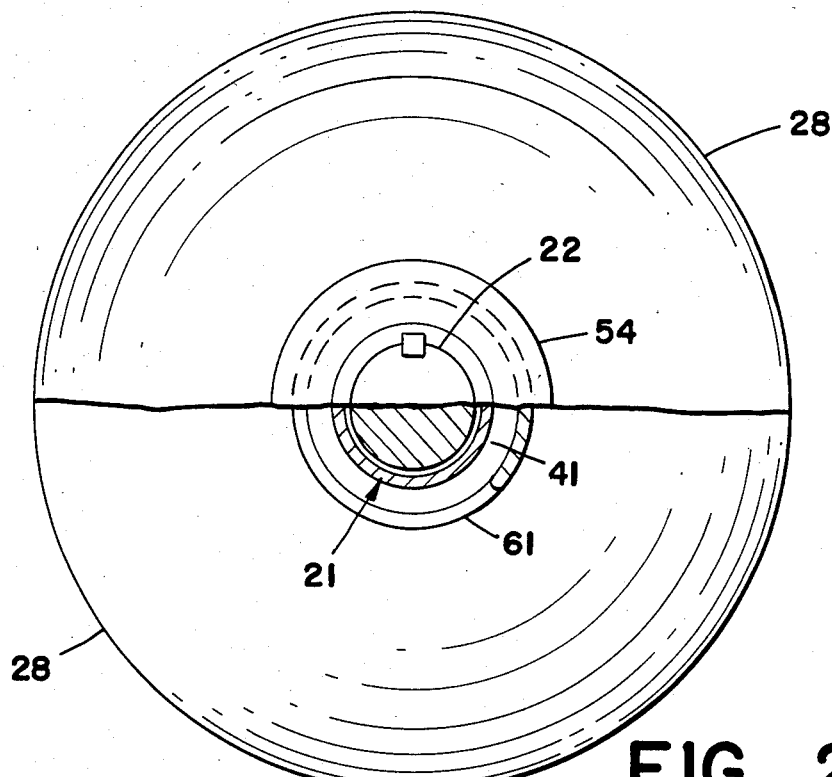
FIG_2
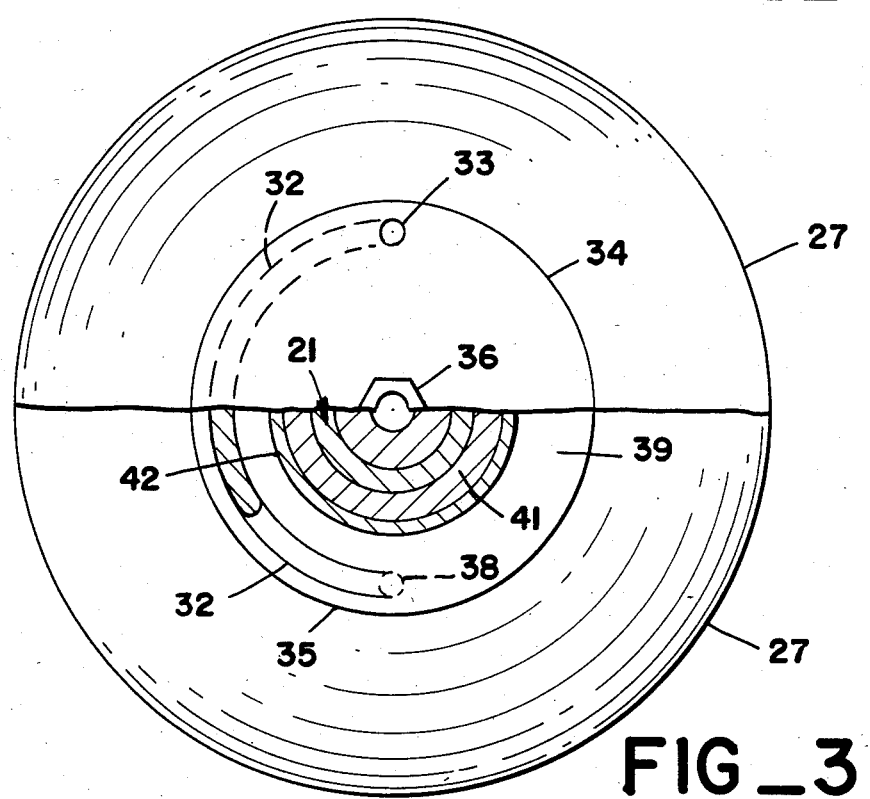
FIG_3

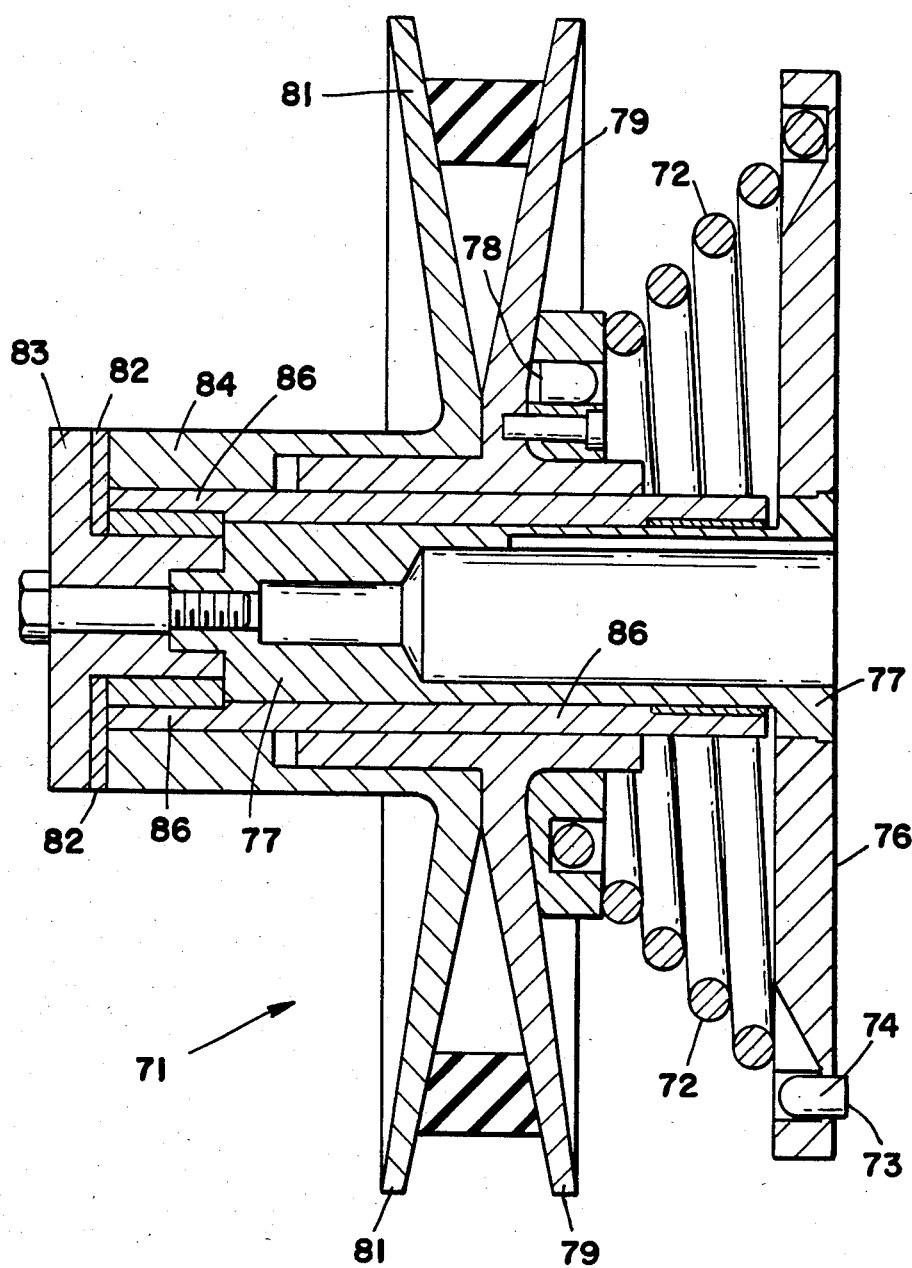
FIG_4

COMPACT VARIABLE SPEED PULLEY ASSEMBLY

BACKGROUND OF THE INVENTION

The present invention relates, in general, to variable speed pulley assemblies, and more particularly relates to variable speed pulley assemblies which are coupled by a spring biasing element to effect the transmission of torque to the pulley faces and to effect biasing of the pulley faces toward each other.

Variable speed pulleys are widely used in connection with driving a variety of machine tools. Such variable speed pulleys are typically constructed by providing a pair of pulley faces that are mounted, usually by keying, to a common pulley shaft. At least one of the faces will be axially displaceable along the shaft toward the remainder of the faces, and a spring, concentrically mounted with respect to the shaft, urges the pulley faces toward each other. If desired, and without changing the basic function of the variable speed drive, both pulley faces can be movably mounted to the shaft and individually spring biased toward each other. The pulley faces are usually used to drive an endless V-belt, which in turn is mounted to a second pulley assembly.

Variable speed pulleys are especially well adapted for use in connection with driving band saws for precision cutting of metallic workpieces. In a precision band saw it is extremely important to be able to damp vibrations out of the system, since such vibrations can be reflected in poor cutting characteristics. Moreover, many precision band saws are semi- or fully automated for high production output. This automation places a premium on maintenance and on minimization of downtime that can result either from fatiguing of the saw drive train or the V-belt.

When a conventional variable speed pulley is employed to drive a precision band saw, it has been found that detrimental vibrations will be introduced into the system by the variable speed pulley. It is well known that even carefully manufactured V-belts will vary in width over the length of the belt. Such width variation is accommodated by the displaceable faces of a conventional variable speed pulley, but the constant, although slight, adjustment of the pulley faces to accommodate varying belt width will also result in a slight variation in the belt speed. The slight variation in the belt speed, in turn, is communicated back to the motor and/or gear reduction box through the pulley shaft, and the cycling of this speed variation as the pulley assembly is driven will induce vibration in the saw drive train that will be transmitted to the saw blade and adversely effect cutting.

In some instances drive train vibration will be induced by the workpiece material, configuration or manner in which it is gripped. Vibration also can result from other dynamic imbalances in the machine. Whatever the source, the effect on cutting is detrimental.

One approach which has been taken to attempt to eliminate the drive train vibration induced by variable speed pulley assemblies has been to drive the pulley assembly through a torsion spring. Thus, instead of keying the pulley faces for rotation with the pulley shaft, the pulley faces are provided on sleeves which are rotatably mounted to the pulley shaft and a torsion spring coupled to transmit rotational forces between the pulley faces and the shaft. The torsion spring also can be used to provide the double function of urging the pulley faces toward each other to firmly engage the V-belt.

Such prior art torsion spring drives of variable speed pulley assemblies have been found to have two problems. First, while the torsion spring flexes to accommodate speed changes resulting from belt width variations, the torsion spring will not completely eliminate drive train vibration. The torsion spring will flex to accommodate a speed change, but then the stored energy in the spring will cause a torque that goes beyond merely catching up to the speed differential between the shaft and the pulley faces. Thus, the torsion spring drive of pulley faces tends to cause over-correction in one direction followed by over-correction in an opposite direction, "hunting" or oscillation about the desired speed instead of correction to the desired speed.

The second problem discovered in connection with torsion spring driven variable speed pulley assemblies is fatigue of the torsion spring. The transmission of torque as well as a compressive load to the pulley faces fatigues the torsion spring and greatly decreass its useful life. Enlarging the spring to resist fatigue tends to result in a pulley assembly which is undersirably large.

Torsion spring driven, variable speed pulley assemblies have been commercially available for several years. In addition to such commercially available apparatus, the patent literature contains other examples of variable speed pulley assemblies, e.g., U.S. Pat. Nos. 2,283,392, 2,607,235, 2,699,071, 2,891,410, 2,900,834, 2,994,228 and 3,616,706.

In U.S. Pat. No. 2,607,235, instead of keying the pulley faces directly to the pulley drive shaft, the faces are free to rotate with respect to the drive shaft. Torque is transmitted to the pulley faces through the compression springs, which springs also will flex to reduce the tendency to transmit speed variations resulting from variable belt widths backwardly through the pulley shaft to the gear reduction box of the motor. Use of the compression springs, therefore, to drive the pulley faces, instead of keying the pulley faces to the shaft, is helpful in reducing overall system vibration.

In addition to the problem of hunting induced by the torsion springs, the pulley assembly of U.S. Pat. No. 2,607,235 is much more bulky than is desirable. This increase in size cannot be accommodated in some applications. Additionally, the pulley assembly of U.S. Pat. No. 2,607,235 induces belt wear by reason of the fact that the pulley faces are each independently driven and independently rotatable on the pulley shaft. Thus, variations in belt widths and loading on the pulley assembly will induce relative angular displacement between the pulley faces that causes wear, which in turn can induce further speed variation, more torsionally induced hunting and even more wear.

U.S. Pat. No. 3,616,706 discloses a variable speed pulley assembly in which mating tapered transmission surfaces couple the pulley faces to the drive shaft. While accommodating axial displacement of the pulley faces, they do not have the flexure or chushioning effect of driving through a torsion spring. Accordingly, chatter is transmitted to the drive train in a manner similar to keying of the pulley faces directly to the drive shaft.

The remaining of the above-set forth patents are directed to various compression spring assemblies and cam-acting drive systems.

OBJECTS AND SUMMARY OF THE INVENTION

A. Objects of the Invention

Accordingly, it is an object of the present invention to provide a variable speed pulley assembly that will minimize vibration without inducing undesirable over-correction of small speed changes.

Another object of the present invention is to provide a compact, variable speed pulley assembly which is driven through a torsion spring coupling having improved resistance to fatigue.

Another object of the present invention is to provide a compact, variable speed pulley assembly in which gear train vibration induced by source other than the variable speed pulley assembly itself are reduced.

Still another object of the present invention is to provide a torsion spring driven, compact, variable speed pulley assembly having improved response to speed changes, improved resistance to shock loading and hunting-free accommodation of belt width variations.

Still a further object of the present invention is to provide a compact, variable speed pulley assembly which is easy to construct, has a minimum number of parts, is easy to maintain, and is durable.

The compact, variable speed pulley assembly of the present invention has other objects and features of advantage which will become apparent from and are set forth in more detail in the following description of the preferred embodiment and the accompanying drawing.

B. Summary of the Invention

The compact, variable speed pulley assembly of the present invention includes a pair of pulley faces mounted for angular displacement relative to and on a pulley shaft, with at least one of the pulley faces being axially displaceable toward a remainder of the faces. Spring biasing means is provided to bias the pulley faces toward each other, and the spring biasing means is connected to transmit torsional forces between the pulley shaft and one of the pulley faces. The improvement in the pulley assembly of the present invention is comprised, briefly, of motion damping means mounted to the assembly and coupled to apply a damping force resisting relative angular displacement between the shaft and at least one of the pulley faces. The motion damping means preferably is provided as a friction surface mounted between a portion of the pulley shaft and engaging a portion of one of the pulley faces so as to resist the tendency of the torsion spring to over-correct for velocity changes produced, e.g., by variations in belt width.

In another aspect, the improvement in the pulley assembly of the present invention comprises spring biasing means in the form of two springs to resist spring fatigue, with one spring coupled to bias the pulley faces toward each other and the other spring coupled for transmission of torque between the pulley faces and the shaft. Still further, a single conical torsion spring is employed as the drive spring to avoid spring fatigue by increasing spring diameter without substantially increasing spring length.

DESCRIPTION OF THE DRAWING

FIG. 1 is a side elevation view, in cross section, of a compact, variable speed pulley assembly constructed in accordance with the present invention.

FIG. 2 is a reduced, front elevation view, partially in cross section of the pulley assembly of FIG. 1 taken substantially along the plane of line 2—2 in FIG. 1.

FIG. 3 is a reduced, front elevation view, partially in cross section, taken substantially along the plane of line 3—3 in FIG. 1.

FIG. 4 is a side elevation view, in cross section, of an alternative embodiment of the pulley assembly of the present invention.

DESCRIPTION OF THE PREFERRED EMBODIMENTS

The pulley assembly of the present invention includes several components that are common to virtually all variable speed pulleys. Thus, as can be seen in FIG. 1, the pulley assembly includes pulley shaft means, generally designated 21, which is formed for mounting on or coupling to a motor or drive train drive shaft 22. Pulley shaft means 21 is formed with a bore 23 dimensioned for receipt of drive shaft 22 and is formed with a keyway 24 that can be aligned with a keyway 26 in shaft 22, so as to enable coupling of the drive train drive shaft to the pulley shaft by means of a key (not shown) for rotation of the same as a unit.

Mounted to pulley shaft means 21 are a pair of pulley faces 27 and 28. At least one of pulley faces 27 and 28, in this case pulley case 28, is mounted for axial displacement along shaft means 21 in the direction of arrow 29 in a manner which will be more fully set forth hereinafter. The axial displacement of pulley face 28 will allow V-belt 31 to be driven by the pulley faces at different radial distances from the central axis of the pulley assembly. This ability to accommodate varying radial distances between the belt 31 and the central axis of the pulley assembly provides of course, the variable speed aspect of the pulley assembly of the present invention. As belt 31 approaches the central axis of the assembly, the linear speed of the belt is reduced for any given rotational rate of the pulley faces.

In addition, the ability of face 28 to move in the direction of arrow 29 along the central axis of shaft means 21 also enables the pulley faces to accommodate minor variations in the belt width. In prior pulley assemblies, however, such belt width variations produced speed changes that in turn were transmitted back through pulley shaft means 21 and output shaft 22 to the drive train and motor. The cyclic speed changes produced by changing belt width induced vibration and gear chatter, which was transmitted forwardly through the belt 31 to the machine tool with resultant poor performance of the tool during cutting. Similarly, vibrations induced by other dynamic imbalances or the workpiece characteristics or mounting are transmitted to the drive train with the result that the variable speed pulley assembly tends to amplify or perpetuate the vibration.

Initial attempts to overcome vibration problems were based upon coupling pulley faces 27 and 28 to be driven by pulley shaft 21 through a torsion spring, which also was mounted to bias the pulley faces toward each other. Thus, the torsional flexing of a spring coupled between one of the pulley faces and shaft 21 was employed to reduce transmission of speed changes back to the drive train (e.g., speed changes induced by the constant axial oscillation of pulley face 28 to accommodate varying belt widths).

Such a torsion spring drive performed two functions, namely, it biased the pulley face 28 toward the fixed pulley face 27 and it coupled the assembly of pulley faces through the spring to the drive shaft.

While torsion spring driving of variable speed pulley assemblies was found to reduce chatter and vibration, under many operating conditions, two problems remained. First, vibrations were not completely eliminated, and second, torsion spring fatigue was substantial and produced premature failure of the drive spring.

While the use of a torsion spring drive in a variable speed pulley assembly seemed to reduce vibrations under some operating conditions, it seemed to be ineffective or induce vibration under others. After considerable study it was hypothesized that the torsion spring was over-correcting for speed changes. Thus, the torsion spring would flex to accommodate a speed change, but the stored energy in the spring would then drive the pulley faces or pulley shaft beyond the ideal speed that the spring was trying to achieve for a minimum speed change. This resulted in a "hunting" effect in which the torsion spring would over-correct in one direction and then over-correct in the other, which hunting was periodically reinforced by cyclical belt width variations, cyclical dynamic imbalances and/or cyclical workpiece vibration.

The spring fatigue problem could be solved by increasing spring size, but that solution also resulted in an increase in the pulley assembly size. The double function of the torsion spring acting to drive the pulley faces and compress the faces together had the advantage of compactness, which would be defeated by merely increasing the spring size. This double function also apparently had the disadvantage of spring fatigue, which was exacerbated by the continuing vibration problem.

In the improved variable speed pulley assembly of the present invention, the gear train vibration problem has been eliminated by providing motion damping means, generally designated 30, coupled to apply a damping force resisting relative angular displacement between shaft means 21 and at least one of pulley faces 27 and 28. Since the pulley faces are preferably coupled together for rotation as a unit, for example by keying (not shown) to sleeve 41, damping forces on one pulley face are generally transmitted to the other.

In the pulley assembly of FIGS. 1-3, torsional driving of the pulley cases is accomplished by a torque spring 32 which is coupled at a first end 33 to a flange 34 that is secured by bolt 36 to the end 37 of pulley shaft means 21. Thus, first spring end 33 rotates with a portion 34 of pulley shaft 21. A second end 38 of torsion spring 32 is coupled to anchor ring 35 which is secured by fastener 40 to pulley face 27 whereby torsional driving forces are transmitted between flange 34 and pulley face 27 through torsional spring 32, in a manner well known in the art.

In order to minimize wear on the belt, it is preferable that second pulley face 28 be keyed for rotation to first pulley face 27. As shown in FIG. 1, pulley face 27 is provided as a radially extending portion of a sleeve 39 mounted concentrically and keyed to an inner sleeve 41. Pulley face 28 similarly is formed as a radially extending portion of sleeve 42 which is axially slidable on but keyed to inner sleeve 41. While the friction between V belt 31 and the pulley sheaves will tend to cause the faces to move together as a unit on sleeve 41, it is preferable that the two pulley faces be keyed together by a keyway (not shown) that permits axial displacement of face 28 in the direction of arrow 29 along inner sleeve 21.

In order to permit relative angular displacement between the pulley faces and pulley shaft 21, inner sleeve 41 is preferably mounted on a pair of bearing members 43 and 44.

While torsion spring 32 is effective in removing some variations in speed resulting from changes in belt width, torsion spring 32 also induces hunting or over-correction that in turn results in vibrations in the gear train. Accordingly, motion damping means 30 can advantageously be provided as a sliding friction surface or brake pad 51 positioned between shaft means 21 and the pulley faces. In the form of the motion damping means shown in FIG. 1, annular pad 51 is mounted between collar 34 and end wall 52 of sleeve 39 and end wall 53 of sleeve 41. The annular friction pad or brake means 51 is preferably positioned as shown in FIG. 1 in sliding contact with collar 34 and sleeves 39 and 41. Alternatively, annular pad 51 can be fixedly secured to flange 34 and in sliding contact with the end walls of sleeves 39 and 41, or it can be fixedly secured through end walls 52 and 53 of the sleeves and in sliding contact against flange 34.

The annular braking pad in effect acts as a combined disk brake and shock absorber which prevents over-correction or hunting resulting from the flexure of the torsion spring 32 during driving of the pulley faces. Thus, the advantage of flexure of torsion spring 32 to accommodate speed changes resultant from variation in belt width 31, machine dynamic imbalances or workpiece characteristics is present in the pulley assembly, and the motion damping pad prevents over-correction to thereby rapidly damp out and prevent cyclic reinforcement of the over-correction.

As will be appreciated, it is possible to brake or damp out relative angular motion between the sleeves on which the pulley faces are mounted and the central axle or shaft 21 of the assembly in a number of different locations. The opposite end of the pulley assembly or both ends of the assembly can be employed, but the location between the coplanar end walls 52 and 53 and the flange 34 is particularly advantageous since the pulley assembly preferably includes a compression spring 61 which tends to drive sleeves 39, 41 and 42 toward flange 34 and thus motion damping means 30. Engagement of a circumferentially extending surface of the sleeves 39, 41 and 42 by a motion damping means or braking surface would also have the effect of damping out torsionally induced over-correct.

It is preferable that braking pad 51 be formed of a material having some resiliency along the longitudinal axis of the assembly. Thus, a nylon washer will advantageously provide the assembly with an axial shock absorbing capability, as well as act as a motion damping brake pad.

The problem of torsion spring fatigue has been solved in the pulley assembly of the present invention in two ways. As shown in FIG. 1, the spring biasing means for the pulley assembly is provided, not by a single torsion spring, but by torsion spring 32 and compression spring 61. Instead of trying to provide a double function of torsion and compression in a single spring, the torsionally driven variable pulley assembly of the present invention preferably employs a first spring 32 coupled to transmit the torque forces and a second spring 61 coupled to bias the pulley faces toward each other. Most preferably spring 61 biass the entire sleeve assembly 39, 41 and 42 toward motion damping means 30.

In order to maintain the compact structure of the variable pulley assembly of the present invention, the torsion and compression springs are preferably mounted in opposite sides of the pulley faces. Compression spring 61 is positioned in a notch 62 in flange 54 which forms a part of the pulley shaft 21. The other end of spring 61 bears against the outer side or wall 63 of pulley face 28. It is preferable, however, that neither end of spring 61 be coupled so as to allow transmission of torsional forces between flange 54 and pulley face 28. Thus, second spring 61 is loaded in compression without any substantial torsional load. This permits the spring 61 to be relatively small and compact in size and yet bias the face 28 towards face 27 and the entire sleeve assembly toward brake means 30.

As will be seen in FIG. 1, torsion spring 32 will normally be somewhat larger in size so as to permit transmission of the torsion forces. The first or torsion spring 32, however, is not formed or loaded with any substantial compression force, other than that induced by spring 61 and torquing of the torsion spring. To the extent that there is any compression in the torsion spring 32, it should not be so large as to be greater than the compression force in spring 61 or else the sleeves 39 and 41 will be urged away from motion damping braking pad 51.

Another solution to the problem of torsion spring fatigue is shown in FIG. 4. In the pulley assembly, generally designated 71 of FIG. 4 the spring biasing means for the variable speed pulley assembly is provided by a single conical torsion and compression spring 72. First end 73 of spring 72 is mounted to extend through a bore 74 in flange plate 76, which in turn is coupled to rotate with pulley shaft 77. An opposite end 78 of the spring is coupled to pulley face 79 so that torsional forces are transmitted between pulley shaft 77 and the assembly of pulley faces 79 and 81 through spring 72.

In order to enable the use of a larger torsion spring which will resist fatigue, torsion spring 72 will be seen in FIG. 4 to be provided as a conical spring. This permits a greater number of coils to be employed without increasing the overall axial length of the pulley assembly to any substantial degree. Thus, the compression function and torsion function can be provided by a single conical spring of sufficient size to accommodate compression and torsion loading without fatigue.

In order to ensure damping of the over-correction which can be induced by the torsion spring 72, it is preferable that the pulley assembly include a motion damping means, such as a braking pad 82, positioned between flange 83 and the ends of sleeves 84 and 86 in a manner described in detail in connection with FIGS. 1-3. The combination torsion and compression spring 72 is preferably positioned on a side of the flanges which ensures that the pulley face assembly is urged toward the motion damping means 82 for cooperation therewith to damp relative angular displacement between the sleeve assembly and pulley shaft 77.

Accordingly, the pulley assembly of the present invention is constructed in a manner employs the benefits of a torsion spring drive and yet damps out over-correction which occurs with such drives. It is believed that the torsion spring and frictional damping brake maintains the load on the driven gears in the gear train at all times so that slack does not occur in the gear train which would cause chatter. Such vibration reduction and elimination substantially increases the life and reduces the required maintenance for the variable speed pulley assembly. The increase in useful life is accomplished without substantially increasing the overall size, in particularly length, of the variable speed pulley assembly.

What is claimed is:

1. A compact variable speed pulley assembly including pulley shaft means, a pair of pulley faces mounted for angular displacement relative to said shaft means, at least one of said pulley faces being axially displaceable along said shaft means toward a remainder of said pulley faces, and spring biasing means mounted to bias said pulley faces toward each other and coupled to transmit torque between one of said pulley faces and said shaft means, wherein the improvement in said pulley assembly comprises:

motion damping means mounted to said pulley assembly and formed and coupled to apply a damping force resisting relative angular displacement between said shaft means and at least one of said pulley faces.

2. The variable speed pulley assembly as defined in claim 1 wherein, said motion damping means is positioned between a portion of said shaft means and a portion of said one of said pulley faces.

3. The variable speed pulley assembly as defined in claim 1 wherein, said motion damping means is provided as a friction surface fixedly slidably mounted with respect to both said shaft means and said pulley faces.

4. The variable speed pulley assembly as defined in claim 1 wherein, said pulley faces are provided by a pair of sleeves each having a radially extending pulley face thereon and each being rotatably mounted on said shaft means, said pulley faces are coupled together for rotation as a unit, and said motion damping means is provided by friction means interposed between and in sliding frictional engagement with at least one of said shaft means and said sleeves.

5. The variable speed pulley assembly as defined in claim 4 wherein, said friction means is provided as a braking pad formed from a resilient material.

6. The variable speed pulley assembly as defined in claim 5 wherein, said braking pad is provided as an annular nylon braking disk concentrically mounted on said shaft means and formed to slidably engage an end surface of said one of said sleeves.

7. A variable speed pulley assembly as defined in claim 1 wherein, said spring biasing means is provided by at least two spring members with a first of said spring members being coupled to transmit torsion forces between said pulley faces and said shaft means, and a second of said spring members being formed to bias said pulley faces toward each other.

8. A variable speed pulley assembly as defined in claim 7 wherein, said second spring member is coupled to said assembly to apply said biasing force substantially without transmitting torsion forces between said faces and said shaft means.

9. The variable speed pulley assembly as defined in claim 7 wherein,
said spring members are coupled to opposite sides of said pulley faces, and said second of said spring members is mounted and formed to bias said pulley faces toward said motion damping means.

10. A variable speed pulley assembly as defined in claim 8 wherein,
said spring members are both concentrically mounted about said shaft means, said second spring members is coupled between a first pulley face and axial support means, and said first spring member is coupled between a second pulley face and said shaft means.

11. A variable speed pulley assembly as defined in claim 1 wherein,
said spring biasing means is provided by a conical torsion and compression spring concentrically mounted about said shaft means and coupled between said shaft means and one of said pulley faces.

12. A variable speed pulley assembly as defined in claim 11 wherein,
said conical torsion and compression spring is mounted to urge said pulley faces toward said motion damping means.

13. A compact variable speed pulley assembly including pulley shaft means, a pair of pulley faces mounted for angular rotation relative to said shaft means, at least one of said pulley faces being axially displaceable along said shaft means toward a remainder of said pulley faces, and spring biasing means mounted to bias said pulley faces toward each other and coupled to transmit torque between one of said pulley faces and said shaft means, wherein the improvement in said pulley assembly comprises:
said spring biasing means is provided by at least two spring members with a first of said spring members being coupled to transmit torque between said one of said pulley faces and said shaft means, and a second of said spring members being coupled to bias said pulley faces toward each other.

14. A compact variable speed pulley assembly including pulley shaft means, a pair of pulley faces mounted for angular rotation relative to said shaft means, at least one of said pulley faces being axially displaceable along said shaft means toward a remainder of said pulley faces, and spring biasing means mounted to bias said pulley faces toward each other and coupled to transmit torque between one of said pulley faces and said shaft means, wherein the improvement in said pulley assembly comprises:
said spring biasing means is provided by a conical spring mounted concentrically about said shaft means and formed and coupled to both transmit said torque and bias said pulley faces toward each other.

* * * * *